_____

2,901,361

MOLD RELEASE AGENT

Frederick W. Meisel, Jr., South River, N.J., assignor to Allied Asphalt & Mineral Corp., New York, N.Y.

No Drawing. Application September 6, 1956
Serial No. 608,213

2 Claims. (Cl. 106—38.23)

_____

This invention relates to improved materials for use in releasing, for example, metal, plastic, and rubber molded articles from the mold or dies in which they are formed. More particularly, it relates to mold release agents which do not melt and flow at the high temperatures often essential in molding operations.

Generally speaking, mold release agents are used to prevent molded articles from adhering to the molds since such adherence may result in damage to the articles or to the molds. Mold release agents are usually thin films of oily or semi-solid substances used on the surfaces of the molds or dies. The films prevent contact between the molds and the articles being formed therein. Thus, if no release agent is used and the object being formed has a protruding portion with a corresponding crevice in the mold, there may be a tight fit therebetween during extraction resulting in break off of the protrusion. This not only ruins the article being formed, but requires extensive work to clean the mold or die. The use of an efficient mold release agent, however, eliminates these difficulties by use of a proper lubrication to facilitate in extraction.

Molded articles may also adhere to the surfaces of molds or dies because of a natural adhesiveness of the materials being molded or formed, e.g. rubber, plastics, etc. Further, it is often desirable to reuse sand molds and the like which might disintegrate under the stress of extraction due to the smallest adherence between article and mold. In such cases an efficient mold release agent reduces adherence so materially that damage to mold or article is very substantially reduced. Additionally, such practical mold release agents lubricate ejector pins and other moving parts often used in dies for die casting of such materials as zinc and aluminum. Accordingly, some of these mold release agents may also be used to lubricate the surfaces of dies in extrusion of plastics, drawing of metals and other similar processes; thus, the expression "mold release agent" as used herein is intended to include substances used for such purposes.

Prior to my invention materials such as oils, waxes, greases, soaps, esters, glycerol, and paraffin oils were used as mold release agents. The particular mold release agent was selected for its incompatibility with the particular material being molded, considering also the temperature and pressure of the molding operation and other such conditions. However, such materials were generally unsatisfactory for use when molding at elevated temperatures for they become thin and so deteriorate that they no longer adhere to the mold surfaces, tending to flow along the mold surfaces to recesses therein and otherwise be unsuitable. Consequently, some mold surfaces would lack any release agent while other parts, particularly crevices and lower portions, would be overloaded therewith. Further, some of these prior release agents tended to oxidize leaving an encrusted deposit on the mold surface, gradually enlarging to change mold dimensions and cause distortions. Further, prior release agents were unstable, particularly when exposed to high temperatures. Difficulties were also experienced because the release agents reacted with the material being molded to cause contamination such as discoloration of the surface of the molded article and other undesirable effects.

In U.S. Patent No. 2,676,148 there are disclosed materials made by mixing various oils with esterified silicas. The nature, composition, and method of making esterified silicas, hereinafter referred to as "estersils," are disclosed in U.S. Patent No. 2,657,149. Briefly, estersils are the reaction products of silica substrates and various alcohols. The mixture of an estersil with an oil or like substance provides a gelled grease whose consistency and viscosity remain substantially constant with change in temperature. Moreover, such oils have greater chemical stability, particularly resistance to oxidization, when so gelatinized and are less compatible upon contact with other materials. These materials, when thickened or gelled with estersils, have good lubrication properties which are retained at the elevated temperatures required by many molding operations. Thus, mixtures of estersils and many of the materials used as release agents prior to my invention have characteristics making far superior mold release agents, these old materials and others which may be thickened with estersils to obtain such desirable characteristics being hereinafter referred to as "release materials." However, such mixtures often have a relatively thick consistency resulting in difficulties in application to mold surfaces, sometimes requiring a spatula or the like; even then it is difficult to achieve a thin, even coating, particularly on irregular surfaces. Moreover, this method of application involves considerable time compared with the spraying or painting of prior ungelled release agents.

Accordingly, it is an object of this invention to provide improved mold release agents for use in both high and low temperature molding techniques. Another object is to provide an improved mold release agent of the above character suitable for use in the molding of plastics, rubber, and metal, and in the extrusion and drawing of plastics and metals. It is another object of my invention to provide mold release agents of the above character which are non-flowing at high temperatures. A further object of my invention is to provide mold release agents of the above character formed from estersil gels. Yet another object of my invention is to provide a mold release agent of the above character which may be sprayed or painted on the surface of a mold or die. A still further object of my invention is to provide a mold release agent of the above character which is easily applied to surfaces of varying configurations. Yet another object is to provide a mold release agent of the above character which forms an even coating on the surfaces of the mold or die. A further object of my invention is to provide a mold release agent of the above character which is chemically stable at high temperatures. Another object is to provide a mold release agent of the above character which is suited for storage in a container under high pressure and in such condition that it may be released as a comparatively even spray of thin texture thus making for easy application. A final stated object of my invention is to provide a mold release agent of the above character which lubricates the release pins and other moving parts in molds and dies. Other objects will be in part obvious and in part pointed out hereinafter.

The invention accordingly comprises the composition of matter possessing the characteristics, properties, and the relation of constituents which will be exemplified in the composition hereinafter described and the scope of the invention will be indicated in the claims.

In general, my improved mold release agent is a sprayable or paintable mixture of an estersil gel base in an evaporable vehicle. The vehicle is relatively thin in consistency and accordingly the mold release agent is thin enough to be applied to the mold or die by brush or spray gun or other means to form a thin, even film thereon. The vehicle then evaporates, leaving behind a film of the gel which, as described above, is an ideal release agent. The estersil gel base is composed of an estersil and a grease or other suitable material selected for its release properties, chemical stability, and incompatibility with the material being molded. The vehicle may be water where the temperature of the mold is sufficiently high to cause rapid evaporation thereof, the water being mixed with the gel and suitable emulsifying agents to form an emulsion; it may also be a volatile solvent selected for chemical incompatibility with the gel, the constituents thereof, and the molded material. Such a mixture of the estersil gel base wtih an evaporable vehicle thus provides an easily applied mold release agent having marked resistance to flow at high temperatures, which does not react wtih the material being molded, which suffers but slight oxidization in use, and which has desirable lubricating properties as described above.

More specifically, as a base I use a gel comprising a homogeneous mixture of an estersil and a release material. The estersils as noted above are described in U.S. Patent 2,657,149 and I have found particularly suited to my use the types marketed by Du Pont under the trademarks "Valron" and "Estersil GT." The release materials should be selected for their suitability with the material being molded and the particular mold or die being used. As stated above, particular characteristics of the release material to be ascertained are incompatibility with the material being molded and with the material comprising the mold or die; the stability of the release material at the temperatures to be encountered in the molding process is also important. Thus, for example, I have found that for die casting zinc, it is preferable to use a paraffinic base oil as a release material, the oil being suitably stabilized to withstand high temperatures; the oil marketed by the Esso Refining Company under the trademark "Teresso #140" is suitable for this purpose. Polyalkylene glycol is a preferred release material for use in the molding of aluminum, rubber, and certain plastics. The gels formed from these materials contain from three to twelve percent by weight of estersil depending on the particular estersil used and the consistency desired in the release agent. The ingredients are thoroughly mixed by homogenization or other suitable methods, the time depending on the particular ingredients and on the degree of uniformity required in the agent.

While many materials may be used as vehicles to form emulsions of the estersil gel, I prefer to use water, which is readily evaporable and does not adversely affect the physical or chemical characteristics of the gel. The water emulsion is formed by using a suitable emulsifying agent, e.g. a polyoxyethylene lauryl ether; a suitable rust inhibitor such as sodium nitrite may added where iron or steel molds are to be used. More specifically, I prefer to mix the estersil gel with an oil-soluble emulsifying agent and a portion of the water vehicle. Next I add more water together with a relatively hydrophilic emulsifying agent; and then the rust inhibitor and the remaining water are mixed in. The material is then preferably homogenized to thoroughly mix into ultimate particle size. The emulsion thus obtained may be sprayed or painted on the surface of the mold, after which the vehicle evaporates leaving the estersil gel coating on the mold surface.

Where a solvent vehicle is used, the estersil gel is preferably dispersed in a volatile solvent which should also be selected for its inability to affect the chemical and physical characteristics of the gel and its incompatibility with the material comprising the mold. For example, with a plastic mold it is undesirable to use a solvent which dissolves or reacts with the plastic of which the mold is made. The estersil gel dispersion as formed is applied to the surface of a mold in a manner similar to that for the water emulsion, the solvent evaporating and leaving an estersil gel film thereon. Volatile solvents are particularly preferred where the mold temperature is below that required for rapid evaporation of water. It may also be desirable to use an estersil gel emulsion in a self-pressurized vessel, in which case the solvent and propellent and possibly a suitable dispersing agent such as polyoxyethylene lauryl ether must be compatible not only with the gel and its constituents, but with each other as well; I have found that a monofluoromethane solvent and a difluoromethane propellent are suitable for this purpose. The propellent forces the solution from the vessel and through an atomizing nozzle for spraying on mold surfaces, the solvent evaporating after such application to leave a coating of the estersil thickened release chemical. The pressurized vessel thus provides a self-pressurized spray which is particularly useful in that it is portable and easily packaged in small units, eliminating the need for heavy, complicated, costly spraying equipment.

The use of the estersil gel with an evaporable vehicle, either of the water or solvent type, thus permits the spraying or painting of the release agent on the surfaces of a mold or die to provide a thin, even film extending over the entire surface thereof, even in the crevices found in many dies. Thus, I have provided a practical way of utilizing the non-flowing, non-oxidizing, and otherwise stable properties of estersil gels (theretofore not available) in mold release agents.

My invention is illustrated by the following examples to which, however, it is not limited. Examples I, II, and III illustrate the preparation of water emulsions of estersil gels used as mold release agents in the die casting of zinc and aluminum and the molding of rubber and certain plastics. Example IV illustrates the use of a solution of an estersil gel for use in a pressurized vessel as a release agent for the die casting of zinc.

*Example I*

Preferably an estersil marketed by Du Pont under the trademark "Valron" is mixed in a manner to be described with a paraffinic base oil preferably that marketed by Esso Refining Company under the trademark "Teresso" in the ratio of 2.45 parts by weight of estersil to 32.55 parts oil. The estersil is slurried with the oil at approximately 120° F. in order to substantially eliminate occluded air and to start the gel formation. When gelation of the mixture has started, it is homogenized under 8,000 pounds per square inch pressure to obtain maximum dispersion. The estersil gel thus formed is mixed with five parts of a relatively hydrophobic polyoxyethylene lauryl ether, an oil soluble emulsifying agent, and then with fourteen parts of water; an ether suitable for this purpose is that of Atlas Powder Company known by the trademark "Brij #30." A solution of fourteen parts water and ten parts of a relatively hydrophilic polyoxyethylene lauryl ether emulsifying agent, e.g. that marketed by Atlas Powder Company under the trademark "Brij #35," is then added to the above gel mixture. To this is added two parts of sodium nitrite rust inhibitor dissolved in 20 parts water and the resulting mixture is homogenized at a pressure of 8,000 pounds p.s.i. to obtain ultimate particle size.

When the estersil gel emulsion thus obtained is sprayed on a hot zinc mold, the water evaporates leaving behind a thin film of the estersil-oil gel having the non-flowing, temperature insensitivity, stability, and non-oxidizing characteristics described above. The emulsifying agents, which become a part of the gel, and the sodium nitrite, which is in suspension therein, leave substantially unaffected these properties of the release agent.

Example II

In accordance with the procedure outlined in Example I, a gel is preferably formed from 2.45 parts by weight of estersil (marketed by Du Pont under the trademark "Valron") and 32.55 parts of a polyalkylene glycol (e.g. that marketed by Carbide and Carbon Chemical Company under the designation "H. B. 5100 X"). The gel is preferably mixed with 3.5 parts of a polyoxyethylene lauryl ether marketed by Atlas Powder Company under the trademark "Brij #30" and then 16.5 parts of water are added. A solution of 14 parts water and 7 parts of a hydrophilic polyoxyethylene lauryl ether (e.g. Atlas Powder Company's "Brij #35") is then mixed in and finally a solution 1.5 parts of sodium nitrite in 20 parts water is added. After final homogenization to obtain ultimate particle size the emulsion may be sprayed or painted on an aluminum mold and, more particularly, a mold used in die casting of aluminum. Upon evaporation of the water the remaining film has the above-described characteristics inherent in an ideal mold release agent.

Example III

Using the process of Example II and the same proportions indicated therein, a water emulsion is prepared in which the estersil gel contains as a release chemical a lower molecular weight polyalkylene glycol preferably of the type marketed by Carbide and Carbon Chemical Company under the trademark "H. B. 2000 X." This emulsion is particularly suitable for depositing a mold release agent on the surfaces of a mold used for producing rubber or plastic articles.

Example IV

An estersil gel is formed using the process and the ingredients outlined in Example I. 12.5 parts of the gel are dissolved in 43.75 parts trichlorofluoromethane and to this solution are added 43.75 parts of dichlorodifluoromethane. The resulting mixture is held under pressure in a vessel, and when the pressure is released through a suitable discharge mechanism, a self-pressurized spray is formed which may readily be applied to the surfaces of a mold or die. The solvent rapidly evaporates, leaving on the surface of the mold a thin film of estersil gel particularly adapted for use in the molding of zinc articles.

In like manner self-pressurized vessels may be prepared for use in the molding of aluminum, rubber, and plastics by using the estersil gels described in Examples II and III. Emulsions and solutions of estersil gels may readily be prepared for the molding of other materials by selecting suitable release materials therefor.

Thus I have described ideal mold release agents which may be sprayed or painted on the surfaces of molds and dies. By combining evaporable vehicles with estersil gel bases containing various release materials, I provide materials which have the characteristics of estersil gels, i.e. resistance to flow at high temperature and pressure, stability and resistance to oxidization at elevated temperatures, and yet which may be applied in a thin, even coating over irregular mold and die surfaces. I have illustrated how water emulsions of the gelled release chemicals may be prepared for use in the molding of materials such as zinc, aluminum, rubber, and plastics, and, additionally, I have described how solutions of these gels in the form of a pressurized vessel may be used where low cost, readily portable applicators are desirable.

It will thus be seen that the objects set forth above, among those made apparent from the preceding description, are efficiently attained and, since certain changes may be made in the above composition of matter without departing from the scope of the invention, it is intended that all matter contained in the above description shall be interpreted as illustrative and not in a limiting sense.

It is also understood that the following claims are intended to cover all of the generic and specific features of the invention herein described, and all statements of the scope of the invention which as a matter of language may be said to fall therebetween.

I claim:

1. A mold release agent for spraying or painting on the surfaces of a mold or the like consisting essentially of a water emulsion including a substantially homogeneous mixture of an estersil and a liquid release material selected from the class consisting of oils, waxes, greases, esters, polyalkylene glycol, and glycerol, and an emulsifying agent consisting essentially of substantially 5 parts hydrophobic polyoxyethylene lauryl ether and 10 parts hydrophilic polyoxyethylene lauryl ether, the proportions by weight of water, estersil, and release material being substantially in the ratio of 48:2.5:32.5.

2. A mold release agent for spraying or painting on the surfaces of a mold or the like consisting essentially of a water emulsion including a substantially homogeneous mixture of an estersil and a paraffinic base oil, hydrophobic polyoxyethylene lauryl ether and hydrophilic polyoxyethylene lauryl ether in which the proportions by weight of water, estersil, oil, hydrophobic polyoxyethylene lauryl ether and hydrophilic polyoxyethylene lauryl ether are substantially in the ratio of 48:2.5:32.5:5:10.

References Cited in the file of this patent

UNITED STATES PATENTS

| Number | Name | Date |
|---|---|---|
| 2,045,913 | Hoy et al. | June 30, 1936 |
| 2,056,048 | Gregory | Sept. 29, 1936 |
| 2,400,001 | Grupelli | May 7, 1946 |
| 2,586,211 | Currie | Feb. 19, 1952 |
| 2,604,664 | Jordan | July 29, 1952 |
| 2,676,148 | Iler | Apr. 20, 1954 |
| 2,692,863 | Iler | Oct. 26, 1954 |